United States Patent
Nordstrom et al.

(10) Patent No.: US 11,176,225 B2
(45) Date of Patent: Nov. 16, 2021

(54) COMPUTER-IMPLEMENTED METHOD, A SYSTEM, AND COMPUTER PROGRAMS FOR DIGITAL FILES MANAGEMENT AND PRESERVATION IN DIGITAL LICENSES

(71) Applicant: BILDOSUND SL, Barcelona (ES)

(72) Inventors: Viktor Nordstrom, Barcelona (ES); Victor Muñoz Sola, Cassa de la Selva (ES); Jose Luis De La Rosa I Esteva, Girona (ES)

(*) Notice: Subject to any disclaimer, the term of this patent is extended or adjusted under 35 U.S.C. 154(b) by 42 days.

(21) Appl. No.: 16/700,473

(22) Filed: Dec. 2, 2019

(65) Prior Publication Data

US 2020/0175138 A1  Jun. 4, 2020

(30) Foreign Application Priority Data

Dec. 3, 2018  (EP) .................................. 18382884

(51) Int. Cl.
| | |
|---|---|
| G06F 21/10 | (2013.01) |
| G06F 21/16 | (2013.01) |
| G06F 21/60 | (2013.01) |
| H04L 9/06 | (2006.01) |
| H04L 9/08 | (2006.01) |
| H04L 9/14 | (2006.01) |
| H04L 9/30 | (2006.01) |
| H04L 9/32 | (2006.01) |

(52) U.S. Cl.
CPC ............ *G06F 21/105* (2013.01); *G06F 21/16* (2013.01); *G06F 21/602* (2013.01); *H04L 9/0637* (2013.01); *H04L 9/0643* (2013.01); *H04L 9/0869* (2013.01); *H04L 9/14* (2013.01); *H04L 9/30* (2013.01); *H04L 9/3213* (2013.01); *G06F 2221/0733* (2013.01); *G06Q 2220/18* (2013.01); *H04L 2209/38* (2013.01)

(58) Field of Classification Search
None
See application file for complete search history.

(56) References Cited

U.S. PATENT DOCUMENTS

2019/0034917 A1* 1/2019 Nolan .................. G06Q 20/065

\* cited by examiner

*Primary Examiner* — William J. Goodchild
(74) *Attorney, Agent, or Firm* — Eugenio J. Torres-Oyola; Victor M. Rodriguez-Reyes; Rafael Rodriguez-Muriel

(57) ABSTRACT

A method, system, and computer programs for digital files management and preservation in digital licenses. The method comprises splitting a digital file into a plurality of tokens and distributing each token over computing nodes (101, 102, 103, 104) participating in a blockchain; splitting a first random key associated to the digital file into a plurality of portions and distributing each portion to each computing node (101, 102, 103, 104); shuffling, randomly, the computing nodes (101, 102, 103, 104) and its associated public keys; for each computing node (101, 102, 103, 104) encrypting the portion with the node's public key, and encrypting the received token and a hash function with a public key; storing a head token that corresponds to a first computing node of the blockchain and its associated public key in a digital license; and generating a multiencrypted key Ra and using the latter as the key for recovering the digital file.

15 Claims, 4 Drawing Sheets

COMPUTER-IMPLEMENTED METHOD, A SYSTEM, AND COMPUTER PROGRAMS FOR DIGITAL FILES MANAGEMENT AND PRESERVATION IN DIGITAL LICENSES

TECHNICAL FIELD

The present invention is directed, in general, to file distribution among computers in a decentralized network. In particular, the invention relates to a computer-implemented method, system, and computer programs, for digital files management and preservation in digital licenses. The digital files may refer to a 3D object, for example, or to other type of objects including 2D and 4D objects.

BACKGROUND OF THE INVENTION

We are living in a revolution of platformized solutions on Internet that move from centralized proprietary services towards decentralized open ones optimized not only with AI but with decentralized transaction ledgers, namely blockchain. It is a melting point of several domains, being a key object of study the processing, storage, and IP preservation of data, knowledge objects, and whatever asset that is worth to preserve its value for the future.

There is need of IP friendly environments for keeping IPP or Intellectual Property (value and digital) Preservation. In particular, the manufacturing, more than the construction sector, uses 3D designs which CAD files suffer the same pros and cons of any digital asset as they can easily be transferred from person to person, making design theft easier than ever; as well, design is an iterative process involving many stakeholders where owners share their work with others, multiplying the potential leaks while end-to-end encryption and authorized users do not legally protect owners from unauthorized use or exploitation of their designs, nor proof their ownership. What will be worse, 3D printing will enable stolen designs to be reproduced anywhere and at a fraction of the fabrication cost: IP theft will be more rewarding even than today.

Apart from that, any database is modified via "transactions", which contain a set of changes to that database which must succeed or fail as a whole. In a regular centralized database, the transactions are validated by a single trusted authority. By contrast, in a blockchain-driven shared database, transactions can be validated by any of that blockchain's users. Since these users do not (fully) trust each other, the database has to contain rules which restrict the transactions performed. A blockchain enables a database to be directly and safely shared by entities that do not trust each other, without requiring a central administrator. With smart contracts one states that all modifications to a contract's data must be performed by its code. To modify a contract's data, blockchain users send requests to its code, which determines whether and how to fulfil those requests.

The biggest challenge in deploying blockchain is the radical transparency which it provides. For example, if 5 banks set up a blockchain together, and two conduct a bilateral transaction, this will be immediately visible to the other three. While there are various strategies for mitigating this problem, none beat the simplicity and efficiency of a centralized database in which a trusted administrator has full control over who can see what.

Initially it was thought that smart contracts could solve this problem. The fact that each smart contract contains its own miniature database, over which it has full control, seems promising. All read and write operations on this database are mediated by the contract's code, making it impossible for one contract to read another's data directly. This tight coupling between data and code is called encapsulation, and is the foundation of the popular object-oriented programming paradigm. So, if one smart contract can't access another's data, have we solved the problem of blockchain confidentiality? Does it make sense to talk of hiding information in a smart contract? Unfortunately, the answer is no. Because even if one smart contract can't read another's data, that data is still stored on every single node in the chain. For each blockchain participant, it's in the memory or disk of a system which that participant completely controls. And there's nothing to stop them reading the information from their own system, if and when they choose to do so.

Hiding data in a smart contract is about as secure as hiding it in the HTML code of a web page. Sure, regular web users won't see it, because it's not displayed in their browser window. But all it takes is for a web browser to add a 'View Source' function, and the information becomes universally visible. Similarly, for data hidden in smart contracts, all it takes is for someone to modify their blockchain software to display the contract's full state, and all semblance of secrecy is lost. A half-decent programmer could do that in an hour or so.

Whatever the answer turns out to be, the key to remember is that smart contracts are simply one method for restricting the transactions performed in a database. This is undoubtedly a useful thing, and is essential to making that database safe for sharing. But smart contracts cannot do anything else, and they certainly cannot escape the boundaries of the database in which they reside.

A known some patent application in the field is EP-A1-3226165 describing systems, methods, devices, and other techniques for using distributed ledgers, such as a blockchain database, to facilitate secure distribution and use of 3D model files to 3D printers or CAD systems over a computing network. A 3D printer controller or CAD system may access an electronic ledger that identifies a plurality of 3D model files that have been made available for distribution. A particular 3D model file and a secret key may be obtained by the printer or the CAD system, where the 3D model file is encrypted based on the secret key. The secret key can be decrypted using a private key associated with the computing device that corresponds to the public key. After decrypting the secret key, the particular 3D model file can be decrypted using the secret key, and after decrypting the particular 3D model file, the particular 3D model file can be executed on the printer to print a physical 3D object or visualized on a CAD system. However, this method has the problem as not knowing what user accesses the 3D file over a given device, therefore this mechanism doesn't stop the user having access to the 3D digital object when the smart contract decides that the license is temporally or numerically expired by simply changing of device.

More solutions are therefore needed for digital files management and preservation in digital licenses.

DESCRIPTION OF THE INVENTION

To that end embodiments of the present invention provide according to a first aspect a computer-implemented method for digital files management and preservation in digital licenses, comprising:

splitting at least a part of a digital file into a plurality of tokens and distributing each split token over a plurality of computing nodes participating in a system based on a blockchain protocol, wherein each computing node has associated a public key, and wherein the digital file has associated a first random key $R_1$ and is subject to a digital license, for example a smart contract;

splitting the first random key $R_1$ associated to the digital file into several portions Ri and distributing each split portion Ri to each one of the computing nodes;

shuffling, randomly, the plurality of computing nodes and its associated public keys, providing a randomly shuffled list of computing nodes and tokens;

for each computing node in the randomly shuffled list of computing nodes and tokens encrypting the split portion Ri with the node's public key, providing an encrypted portion first random key Ri', and encrypting the received token and a hash function related to the address of the following computing node in the blockchain with a public key of the computing node;

storing a head token that corresponds to a first computing node of the blockchain and its associated public key in the digital license, wherein said first computing node might change each time the digital file is accessed or certainly it will change when the digital license decides to ban the access for future usages to that computing node; and generating a multiencrypted key Ra by decrypting the encrypted portion first random key Ri' with a private key associated to each computing node, and using the generated multiencrypted key Ra as the key for recovering the digital file.

Every time a user requests access to a file encrypted with this multitoken multi-signature mechanism, he needs to request the keys of all the nodes in the multi-signature key in the exact order they were initially entered, in order to obtain the key that is needed to decrypt the digital file. An external node would not even be able to rebuild the exact ordering of the nodes required for the signing, as only the tokens know it. Thus, one needs to know which is the first node and possibly the exact sequence to access otherwise the digital object will not unlock. In any case, the strong protection is the fact that every token has to accept the decryption petition for the next one.

In an embodiment, the digital file comprises a 3D object. Preferably, the 3D object comprises a given geometry and/or other associated metadata such as texture, animation and/or motion, among others. In other embodiments the digital file can comprise a 4D object or other types of files such as 2D objects, music, game characters or sceneries, digital pieces of art, databases, documentation in whatever .pdf or office formats, utility models, and even digital licenses or tokens of any other type to those defined in this patent that contain digital assets in a general sense.

In case the digital file is split at a geometry level, the tokens are preferably distributed to each computing nodes with an amount of data of the geometry of the digital file, so that each computing node receives a similar but not necessarily the same amount of data, except for one of the tokens also including the associated metadata of the digital file.

According to the proposed method, the tokens can be equally split or can have different sizes between them. Moreover, the computing device can be one of the computing nodes or alternatively can form part of a trusted component.

The trusted component handles secret keys to access to the digital license and the digital object, so that an additional firewall is had to enforce the law of the digital licenses when they decide to cut off the access to the digital objects apart from the general core defense of the proposed tokenized algorithm.

In an embodiment, the method further comprises publishing the digital file by:
  encrypting the multiencrypted key Ra with a trusted component public key of a user that created the digital file, getting Ra';
  encrypting the digital file with the first random key $R_1$, getting $Fr_1$;
  encrypting a hash of $Fr_1$ with the first random key $R_1$, getting $Hr_1$;
  uploading the following information to the digital license:
    the encrypted multiencrypted key Ra';
    the encrypted hash $Hr_1$;
    two public keys of the user that created the digital file and said trusted component public key; and
    a watermark of the digital file;
  each time the digital file is accessed, for example for reading or editing, using a trusted component private key of the user that created the 3D digital file to decrypt the encrypted multiencrypted key Ra', getting Ra, and a private key of the user that created the digital file to decrypt Ra to get the first random key $R_1$; and
  decrypting the encrypted hash $Hr_1$, getting H, and searching the digital file in a distributed file system, for example an IPFS, and then obtaining the digital file after the latter is decrypted with the first random key $R_1$.

In another embodiment, for editing the digital file, the method further comprises:
  upon at least one computing node editing the digital file, encrypting the digital file with a second random key $R_2$, getting $Fr_2$, and further uploading $Fr_2$ to the distributed file system, and computing a new hash that will be encrypted with $R_2$, getting $Hr_2$;
  calling the digital license and:
    getting a hashmap of the digital file;
    adding the new hash to said hashmap and a new watermark, said hashmap comprising different fields, and putting the previous hash in a "prev" field of the hashmap;
    adding the new watermark to the watermarks hashmap; and
    for each computing node:
      i. go to the computing node's hashmap replacing the old hash with the new one;
      ii. put the new hash to a "next" field of the old file;
      iii. replace the old public keys by new public keys; and
      iv. update a status to "valid".

Other embodiments of the invention that are disclosed herein include a system and software programs to perform the method embodiment steps and operations summarized above and disclosed in detail below. More particularly, a computer program product is one embodiment that has a computer-readable medium including computer program instructions encoded thereon that when executed on at least one processor in a computer system causes the processor to perform the operations indicated herein as embodiments of the invention.

Thus, unlike prevailing solutions, the proposed invention acts as a public, decentralized ledger to provide a single, unified source of data, creating a clearer audit trail and consistency across parties. Present invention uploads and downloads valuable IP content on the blockchain as decentralized storage network turning IP preservation into an algorithmic market to preserve its value. The market runs on a blockchain with a native protocol token managed by miners by providing storage, IP securization, and digital preservation to clients, possibly but not necessarily at a fee in virtual currency. Conversely, clients spend the currency over nodes to preserve, store, mine, and index digital objects and their IP.

Finally, for manufacturing companies who require a definitive resolution to IP protection of their CAD files, present invention is a blockchain based platform that hinders unauthorized distribution, proves ownership, protects unrestricted reproduction from CAD files, and opens a new paradigm of IP preservation with consumers as co-owners well beyond the state of the art.

BRIEF DESCRIPTION OF THE DRAWINGS

The previous and other advantages and features will be more fully understood from the following detailed description of embodiments, with reference to the attached figures, which must be considered in an illustrative and non-limiting manner, in which.

DETAILED DESCRIPTION OF PREFERRED EMBODIMENTS

Present invention provides a method, system, and computer programs for digital files management and preservation in digital licenses, for example smart contracts. The digital files, for example 3D digital objects, are tokenized, distributed via a distributed file system, for example an IPFS protocol, and managed by digital licenses with for example smart contracts for use, update, and guarantee for the licensing terms. In a particular implementation, the invention is deployed on top of Ethereum which means that the tokens with the split of the 3D digital object will be Ethereum tokens and the tokens will talk to the smart contracts enabling the digital objects owners to be rewarded for their IP rights, being it a license.

Figure 1:
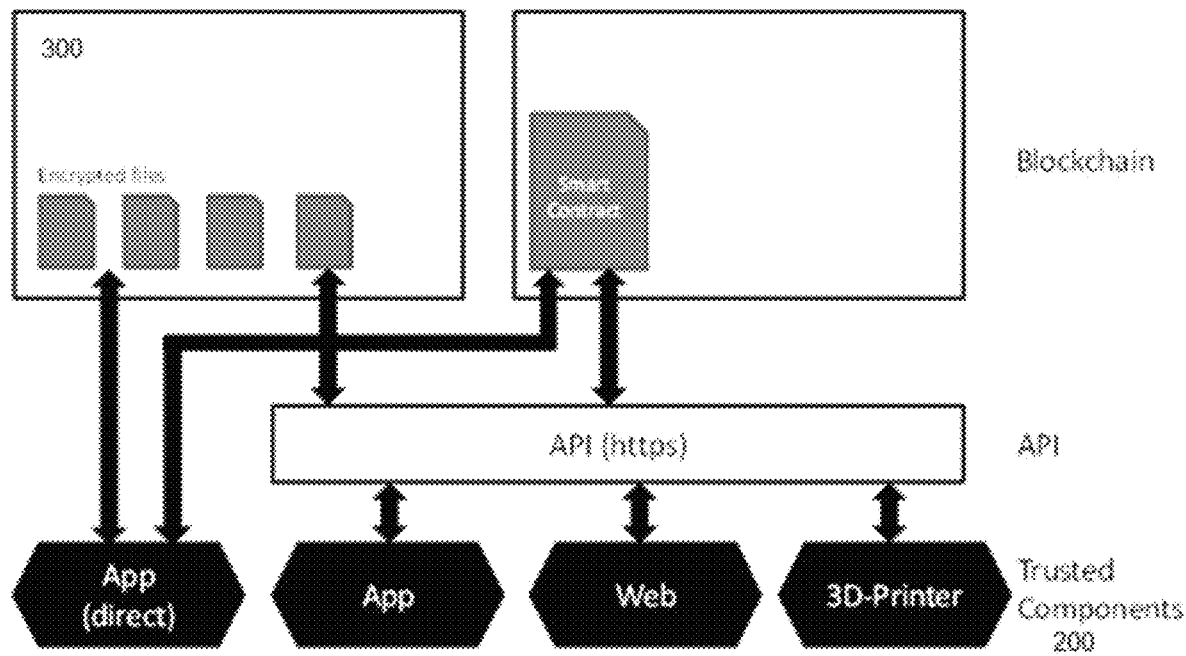
FIG. 1 schematically illustrates an example of the proposed architecture.

FIG. 1 shows an embodiment of the proposed architecture of the invention. The protocol of present invention runs on top of whatever blockchain platform, for example the IPFS to distribute storage of the files (and the split tokens of the files), and the Ethereum to run the digital licenses (as smart contracts). Thus, the proposed algorithms implemented on top of the said two platforms run possibly plugged to the Trusted Components, through services like an API, installed in the web visualization, on the CAD/CAM systems app, or on manufacturing hardware or the 3D-printers.

Figure 2:
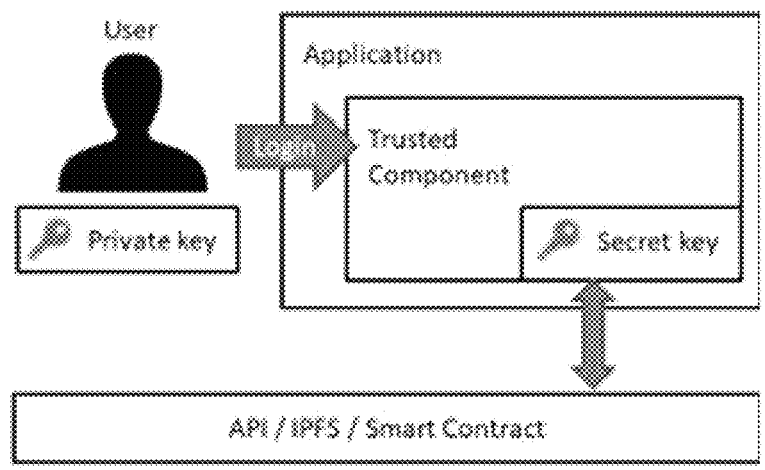
FIG. 2 schematically illustrates an example of the interaction of a user with a trusted component.

FIG. 2 shows an embodiment of the interaction of a user with a trusted component (TC). The trusted component handles secret keys to access to the digital licenses and the digital objects, so that an additional firewall is included to enforce the law of the digital licenses when they decide to cut off the access to the digital objects apart from the general core defense of the tokenized algorithm. The trusted component adds and interesting yet non-essential feature of extra hindering of the content, addresses, and licenses as smart contracts on the blockchain. The trusted component adds the possibility to stop any further access to the 3D digital object by any user that had it in the past.

An example of the smart contract structure is detailed here. The nodes hashmap contains the nodes addresses and their list of files (encrypted hashes). Besides, the hashmap comprises different fields, in particular, Name, WM, pre, next, status, type, init and users.

For each digital file (encrypted hash) the object contains:
Descriptive file name
Watermark
Previous file hash
Next file hash
Status (valid or invalid)
File type (format)
Init info
   Created by
   Creation date
   First access
Users list (addresses)
Hashmap of users with access to the file, with:
   User address
   User public key
   Trusted component public key
   Encrypted file encryption key R
   User permissions
      Type (Admin, view, edit, download)
      Time (until day D, X time since the first access)
      Use (load X times, edit X times, download X times)
      indeed: rights (edit, view, play, etc.) and conditions
         (times, temporal, pay per use, etc.)

For each watermark, the corresponding encrypted file hash.

Figure 3:
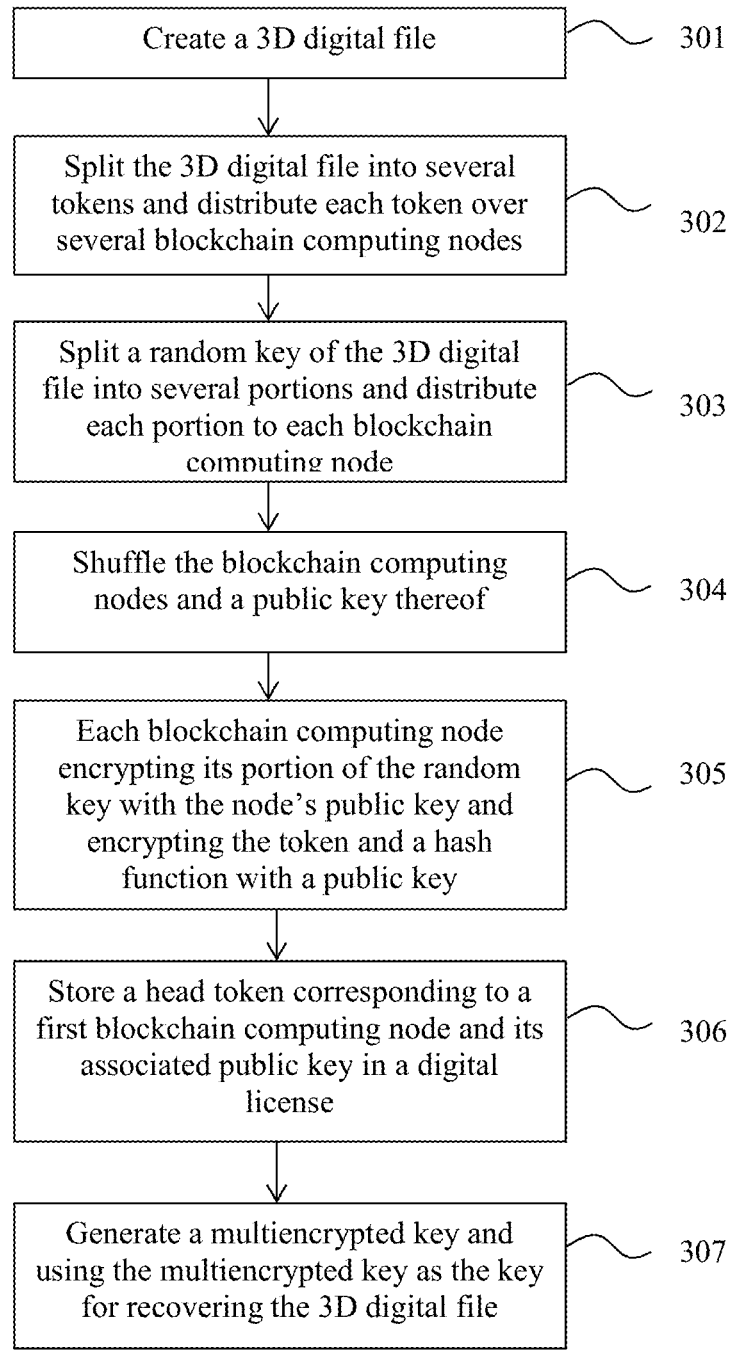
FIG. 3 is a flow diagram showing an embodiment of a method for digital files management and preservation in digital licenses.

With reference now to FIG. 3, a flowchart is shown of a method for digital files management and preservation in digital licenses. According to this embodiment, at step 301, a user creates a 3D digital file with a given geometry and preferably other associated metadata such as texture, animation and/or motion. Other types of metadata can be also included, for example a textual description of the 3D digital file.

At step 302, a computing device having at least one memory including computer program instructions and one or more processors splits, a part of or the entire digital file into a plurality of tokens and distributes each split token over a plurality of computing nodes 101, 102, 103, 104 participating in a system based on a blockchain protocol. The computing device can be part of a trusted component or can be one of the plurality of blockchain computing nodes. Each blockchain computing node 101, 102, 103, 104 has associated a public key, and the digital file has associated a first random key $R_1$ and is subject to a smart contract. The tokens may have all the same size or different size. In some implementations, in particular when the 3D digital file is split at a geometry level, all the tokens are distributed to the blockchain computing nodes 101, 102, 103, 104 with an amount of data about the geometry of the 3D digital file except one of the tokens also including the metadata associated to the 3D digital file.

At step 303, the computing device splits said first random key $R_1$ into several portions Ri and distributes each portion Ri to each one blockchain computing node 101, 102, 103, 104.

At step 304, the computing device randomly shuffles (see FIGS. 4A-4D) the blockchain computing nodes 101, 102, 103, 104 and its associated public keys. Thus a randomly shuffled list of computing nodes and tokens is provided.

At that point, at step 305, each blockchain computing node 101, 102, 103, 104 encrypts its portion Ri with the node's public key, thus providing an encrypted portion first random key Ri', and further encrypts the received token and a hash function with the node's public key. The hash function is related to the address of the following computing node in the blockchain.

At step 306, the computing device stores a head token corresponding to the first blockchain computing node and its associated public key in the smart contract. According to the method, the first blockchain computing node changes each time the 3D digital file is accessed.

At the final step 307, the computing device generates a multiencrypted key Ra by decrypting the encrypted portion first random key Ri' with a private key associated to each blockchain computing node 101, 102, 103, 104. This multiencrypted key Ra is the key that has to be used for recovering the 3D digital file.

Figure 4A:
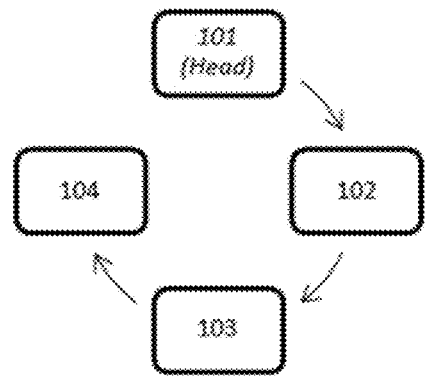
FIGS. 4A-4D schematically illustrate an example of the shuffling process.
Figure 4B:
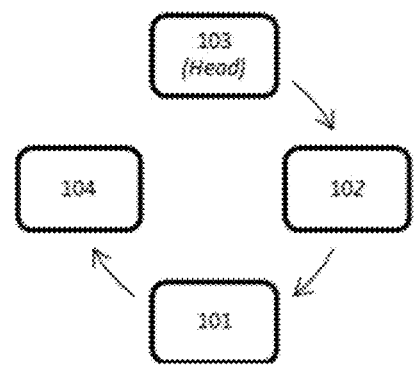
Figure 4C:
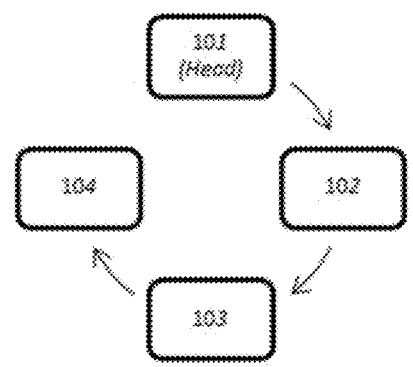
Figure 4D:
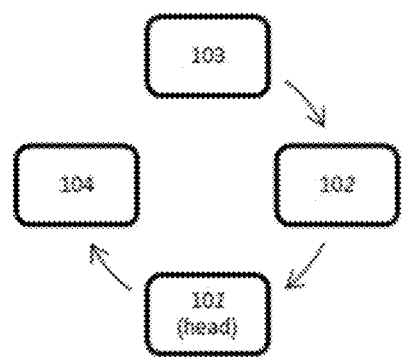

With reference to FIGS. 4A-4D, therein an example of the shuffling process 304 by which the blockchain computing nodes 101, 102, 103, 104 and its associated public keys are shuffled is illustrated. FIGS. 4A and 4B show the position of the blockchain computing nodes 101, 102, 103, 104 before (FIG. 4A) and after (FIG. 4B) the shuffling process. In this particular case when the digital license keeps the head of the tokenchain of the 3D digital file. FIGS. 4C and 4D show the position of the blockchain computing nodes 101, 102, 103, 104 after and before the shuffling process when the digital license forgets the head of the tokenchain of the 3D digital file. In this case only computing nodes 101 and 104 will be possibly accessed (not the full 3D digital file) and neither the full key Ra as only R4' and R1' might be accessed.

Figure 5:
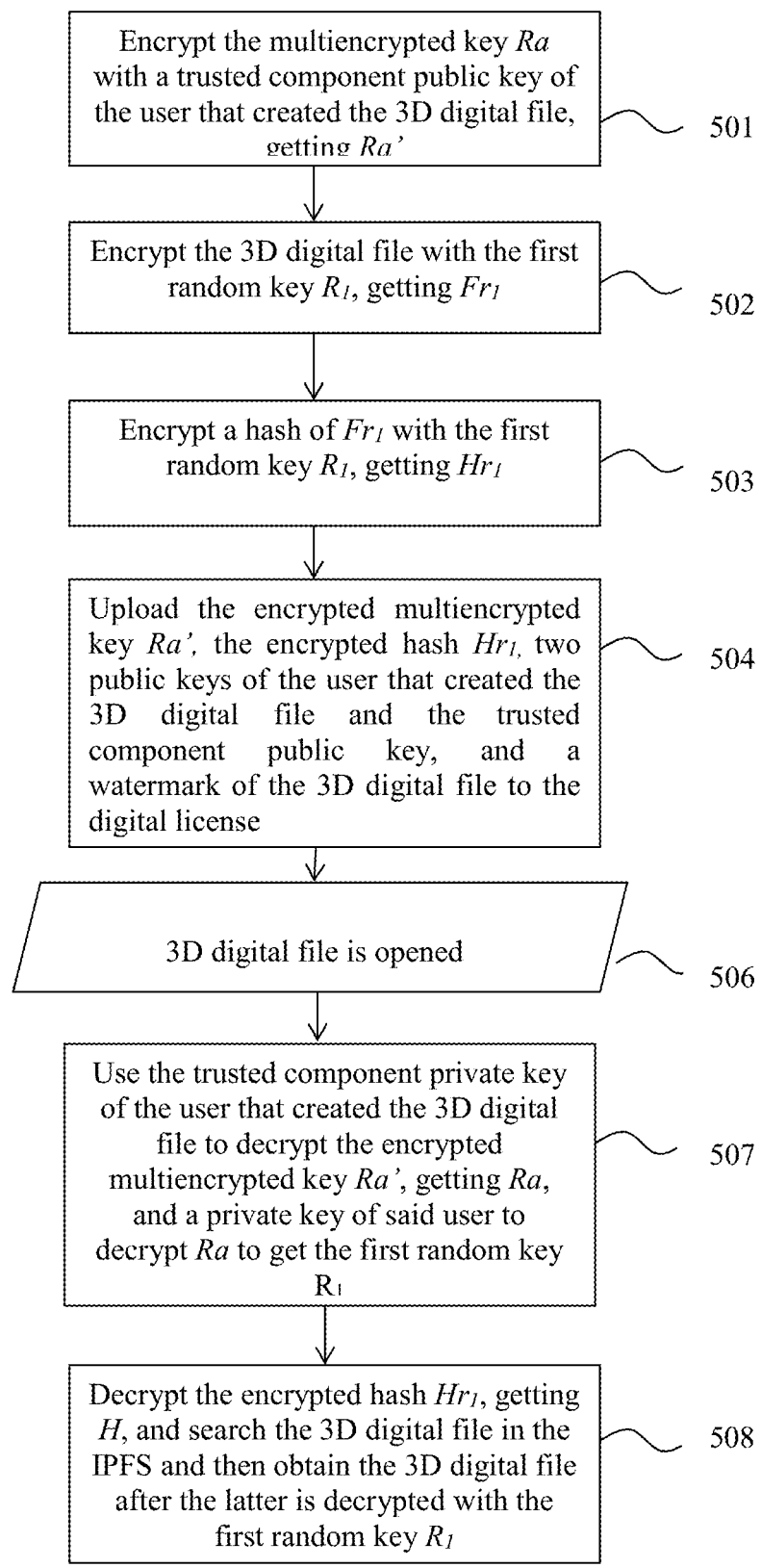
FIG. 5 is a flow diagram showing the process for publishing the digital file, according to an embodiment of the present invention.

With reference to FIG. 5, a flowchart is illustrated of the process for publishing the digital file. According to this embodiment, at step 501, the multiencrypted key Ra is encrypted with a trusted component public key of the user that created the 3D digital file, getting Ra'. At step 502 the 3D digital file is encrypted with the first random key $R_1$, getting $Fr_1$ and at step 503 a hash of $Fr_1$ is encrypted with the first random key $R_1$, getting $Hr_1$.

At that point, step 504 the following information is uploaded to the digital license:
the encrypted multiencrypted key Ra';
the encrypted hash $Hr_1$;
two public keys of the user that created the 3D digital file and said trusted component public key; and
a watermark of the digital file.

At step 506 the 3D digital file is opened, so, at step 507, a trusted component private key of the user that created the 3D digital file is used to decrypt the encrypted multiencrypted key Ra', getting Ra, and the private key of the user that created the 3D digital file is used to decrypt Ra to get the first random key $R_1$.

At the final step 508, the encrypted hash $Hr_1$ is decrypted, getting H, and the 3D digital file is obtained after searching it in a distributed file system 300 such as the IPFS and decrypting it with the first random key $R_1$.

According to another embodiment, in this case not illustrated, the process of editing the 3D digital file comprises, upon at least one computing node 101, 102, 103, 104 edits the 3D digital file, encrypting the 3D digital file with a second random key $R_2$, getting $Fr_2$, and then uploading $Fr_2$ to the distributed file system 300, and computing a new hash that will be encrypted with $R_2$, getting $Hr_2$.

Then call the digital license to store the edition and:
get the old hashmap of the 3D digital file;
add the new hash to the files hashmap with the same users, the new file watermark, and put the old hash in the "prev" field;
add the new file watermark to the watermarks hashmap; and
for each computing node 101, 102, 103, 104:
  v. go to the computing node's hashmap replacing the old hash with the new one;
  vi. put the new hash to a "next" field of the old file;
  vii. replace the old public keys by new public keys; and
  viii. update a status to "valid".

It should be noted that the order of these steps is important since the new version of the 3D digital file will only be usable when its status is set to valid, so if the process is broken (e.g. program crashes, power failure, computer hangs) at any step while updating file hashes, the smart contract does not get corrupted.

According to another embodiment, the process of auditing the 3D digital file comprises calculating its watermark and looking into the smart contract whether the watermark exists and get the encrypted file hash (if it does). The history of the 3D digital file could be obtained from its watermark, yet not the file itself, since it is encrypted.

In yet another embodiment, if the Smart Contract does not unlock in the proper order or starting with the wrong first user, the digital file or its geometry is never complete, so that the 3D object might suffer of errors of any magnitude in its reconstruction or curation using extra information stored in the available tokens. The idea is to prevent anybody using a 3D object not contained in the blockchain and managed by a proper digital license, unless they might suffer the expenses of manufacturing or integrating wrong parts. In those domains that these offchain errors are not that terrible, then this mechanism is not as powerful compared to those where the models are costly (several tens, hundreds or thousands of thousand dollars) and the quality demand is of 100% like in the most of the manufacturing industries or CAM).

The idea is that the digital file is a blockchain of tokens, a tokenchain, where every token knows the next token but not the previous one. So, if the digital file is decomposed in 100 tokens it means that the probability that one user has all the tokenchain is 1/100 only, and the more tokenized, the less probable a user get to have them all. This constraint applies at the moment of saving the digital file out of the blockchain. Thus, missing tokens outchain is the technical solution. As well, multitoken means new authorizations mechanism: whenever the digital file is transferred, shared or visualized, potentially all owners must give (vote/sign) the authorization. The authorization might be automatic and easy to obtain for all operations except for saving it outchain. Thus, this is another way to generate missing IPtokens because it is likely that manual or automatic authorizations will be avoided or postponed the temptation of downloading digital file offchain. The tokenchain will be name 3DDOchain, and will be a format inside the IPFS.

In yet another embodiment, alternative or complementary to the previous one, a subset of tokens might recompose the total digital file using redundancy. Thus a missing token is not that terrible as the digital file could be recomposed progressively with more and more tokens, but being it totally reconstructed out of the blockchain is improbable and unforeseeable. Thus, by default, a tokenized digital file is never dumped OFFchain totally, and always there will be missing tokens that might reconstruct the digital file with a low probability of being complete, despite of the digital file might be looking good in many cases, but not good enough for the quality standards of the manufacturing industry.

The mechanism of redundancy could be similar to the open sourced Parchive. Par2 files generally use this naming/extension system: filename.vol000+01.PAR2, filename.vol001+02.PAR2, filename.vol003+04.PAR2, filename.vol007+06.PAR2, etc. The +01, +02, etc. in the filename indicates how many blocks/tokens it contains, and the vol000, vol001, vol003 etc. indicates the number of the first recovery block within the PAR2 file. If an offchain digital file index file states that 4 blocks are missing, the easiest way to repair the files would be by downloading the missing tokens filename.vol003+04.PAR2 and due to the redundancy, filename.vol007+06.PAR2 is also acceptable.

Par2 specification supports up to 32768 source blocks and up to 65535 recovery blocks. Input files are split into multiple equal-sized blocks so that recovery files do not need to be the size of the largest input file. In present invention implementation could be equal-sized or different size block tokens to make it harder to detect what is the right composition to rebuild the original digital file. Thus, the IPtokens are stored redundantly in IPFS, and as said, a digital file never contains all tokens out of the blockchain (OFFchain), but there is apriori no means to know which the missing token is as the redundant code is always downloaded.

The mechanism for banning tokens to be dumped offchain could be multiple: baseline is the random, could be random each time, could be by particular decision of any owner of whatever token, could be according a programmable rule, could be combined all the previous. Any possibility will be fair, because the novelty is that there is no way to save offchain other than through the digital license, who will always apply this missing token prevention. Under this mechanism, the more tokens the better to make the detection and fix of the missing token more difficult.

The mechanism of this embodiment is that at the moment of downloading out of the blockchain will be managed by the same digital license Smart Contract following this mechanism that preferably will apply:

For every token Tpi=Dpi+redundant data Npi
  Dpi is download onto the recipient T or might be skipped at random, with probability p={0, 1}, for example p=0.9
  There is no trace or evidence that whether a token Dpi is downloaded or not on T or whether it is only the redundant code Npi.
EndFor With T containing the data of many Dpi and all the redundancy Npi, then using this information the Dp digital file is reconstructed. The lower p, the more likely the reconstructed Dp digital file is different from D.

The important thing is to have tuned p with such a probability that Dp is so similar to D but not perfectly equal, so that any attempt to use Dp as the only offchain available version of D might likely fail to imperfect, costly, and damaging printing or manufacturing, that nobody will dare to risk. Additionally, the random algorithm of this process might be substituted by a votation system where every token Tpi belongs to a different owner who might ban anytime the offline download of the digital file.

As a final notice, the two mechanisms might apply at the time so that if one tries to download offchain the digital file D then it might be incomplete because of the lost Head of the tokenchain, and as well some other missing tokens might happen.

Present invention may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The foregoing describes embodiments of the present invention and modifications, obvious to those skilled in the art can be made thereto, without departing from the scope of the present invention.

The scope of the present invention is defined in the following set of claims.

What is claimed is:

1. A computer-implemented method for digital files management and preservation in digital licenses, comprising:
  splitting, by a computing device, at least a part of a digital file into a plurality of tokens and distributing each split token over a plurality of computing nodes participating in a system based on a blockchain protocol, wherein each computing node has associated a public key, and wherein the digital file has associated a first random key $R_1$ and being is subject to a digital license including a Smart Contract;
  splitting, by the computing device, the first random key $R_1$ associated to the digital file into a plurality of portions Ri and distributing each split portion Ri to each one of said plurality of computing nodes;
  shuffling, by the computing device (10), randomly, the plurality of computing nodes and the public keys associated to the plurality of computing nodes, providing a randomly shuffled list of computing nodes and tokens;
  for each computing node in the randomly shuffled list of computing nodes and tokens:
    encrypting the split portion Ri with the node's public key, providing an encrypted portion first random key Ri'; and
    encrypting the token and a hash function related to an address of the following computing node in the blockchain protocol with a public key of the computing node;
  storing, by the computing device, a head token that corresponds to a first computing node of the blockchain protocol and to the public key associated to the first computing node in the digital license, wherein said first computing node changes each time the digital file is accessed; and
  generating, by the computing device, a multiencrypted key Ra by decrypting the encrypted portion first random key Ri' of the first computing node with a private key of the first computing node, and using the generated multiencrypted key Ra as the key for recovering the digital file.

2. The computer-implemented of claim 1, wherein the digital file comprises a 3D object with a given geometry and/or other associated metadata including texture, animation and/or motion.

3. The computer-implemented method of claim 2, wherein each one of the plurality of split tokens have a same or a different size.

4. The computer-implemented method of claim 2, wherein the digital file is split at a geometry level, the split tokens being distributed to each one of the plurality of computing nodes with an amount of data of the given geometry of the digital file except for one token also including said associated metadata of the digital file.

5. The computer-implemented method of claim 1, wherein the splitting comprises splitting the digital file completely into the plurality of tokens.

6. The computer-implemented method of claim 1, further comprising publishing the digital file by:
   encrypting the multiencrypted key Ra with a trusted component public key of a user that created the digital file, obtaining Ra';
   encrypting the digital file with the first random key $R_1$, obtaining $Fr_1$;
   encrypting a hash of $Fr_1$ with the first random key $R_1$, obtaining $Hr_1$;
   uploading the following information to the digital license:
      the encrypted multiencrypted key Ra';
      the encrypted hash $Hr_1$;
      two public keys of the user that created the digital file and said trusted component public key; and
      a watermark of the digital file;
   each time the digital file is opened, using a trusted component private key of the user that created the digital file to decrypt the encrypted multiencrypted key Ra', obtaining Ra, and the private key of the user that created the digital file to decrypt Ra; and
   decrypting the encrypted hash $Hr_1$, obtaining H, and searching the digital file in a distributed file system and then obtaining the digital file after the latter is decrypted with the first random key $R_1$.

7. The computer-implemented method of claim 1, further comprising:
   upon at least one computing node editing the digital file, encrypting the digital file with a second random key $R_2$, obtaining $Fr_2$, and further uploading $Fr_2$ to the distributed file system, and computing a new hash and encrypting the computed new hash with the second random key $R_2$, obtaining $Hr_2$;
   calling the digital license and:
      getting a hashmap of the digital file;
      adding the new hash to said hashmap and a new watermark, said hashmap comprising different fields, and putting the previous hash in a "prev" field of the hashmap;
      adding the new watermark to a hashmap of the watermark; and
      for each computing node:
         i. go to a hashmap of the computing node, replacing an old hash with a new hash;
         ii. put the new hash to a "next" field of an old file;
         iii. replace the public keys by new public keys; and
         iv. update a status to "valid".

8. The computer-implemented method of claim 1, further comprising storing the plurality of split tokens redundantly in a distributed file system.

9. The computer-implemented method of claim 1, wherein the computing device is included in one of the plurality of computing nodes or forms part of a trusted component.

10. A system for digital files management and preservation in digital licenses, comprising:
   at least one memory including computer program instructions; and
   one or more processors, wherein the computer program instructions, when executed by the one or more processors, cause to:
      split at least a part of a digital file into a plurality of tokens and distribute each split token over a plurality of computing nodes participating in a system based on a blockchain protocol, wherein each computing node has associated a public key, and wherein the digital file has associated a first random key $R_1$ and is subject to a digital license including a Smart Contract;
      split the first random key $R_1$ associated to the digital file into a plurality of portions Ri and distribute each split portion Ri to each one of said plurality of computing nodes;
      shuffle, randomly, the plurality of computing nodes and the public keys associated to the plurality of computing nodes, providing a randomly shuffled list of computing nodes and tokens;
   wherein each computing node in the randomly shuffled list of computing nodes and tokens encrypts the split portion Ri with the node's public key, providing an encrypted portion first random key Ri', and encrypts the token and a hash function related to an address of the following computing node in the blockchain protocol with a public key of the computing node;
      store a head token that corresponds to a first computing node of the blockchain protocol and to the public key associated to the first computing node in the digital license, wherein said first computing node changes each time the digital file is accessed; and
      generate a multiencrypted key Ra by decrypting the encrypted portion first random key Ri' of the first computing node with a private key of the first computing node, and use the generated multiencrypted key Ra as the key for recovering the digital file.

11. The system of claim 10, further comprising a 3D printer for creating the digital file with a given geometry and/or other associated metadata including texture, animation and/or motion.

12. The system of claim 11, wherein the computer program instructions, when executed by the one or more processors, cause said splitting of the plurality of tokens with a same or a different size.

13. The system of claim 11, wherein the computer program instructions, when executed by the one or more processors, in said step a) cause the splitting of the digital file at a geometry level, and a distribution of the split tokens to each one of the plurality of computing nodes with an amount of data of a given geometry of the digital file except for one token also including said associated metadata of the digital file.

14. The system of claim 10, wherein the one or more processors are included in one of the plurality of computing nodes or are included in a computer device of a trusted component.

15. A non-transitory computer readable medium tangibly comprising computer program instructions, which, when executed by a processor causes the processor to implement the method comprising:

- splitting at least a part of a digital file into a plurality of tokens and distributing each split token over a plurality of computing nodes participating in a system based on a blockchain protocol, wherein each computing node has associated a public key, and wherein the digital file has associated a first random key $R_1$ and is subject to a digital license including a Smart Contract;
- splitting the first random key $R_1$ associated to the digital file into a plurality of portions Ri and distributing each split portion Ri to each one of said plurality of computing nodes;
- shuffling, randomly, the plurality of computing nodes and the public keys associated to the plurality of computing nodes, providing a randomly shuffled list of computing nodes and tokens;
- for each computing node in the randomly shuffled list of computing nodes and tokens:
  - encrypting the split portion Ri with the node's public key, providing an encrypted portion first random key Ri'; and
  - encrypting the token and a hash function related to an address of the following computing node in the blockchain protocol with a public key of the computing node;
- storing a head token that corresponds to a first computing node of the blockchain protocol and to the public key associated to the first computing node in the digital license, wherein said first computing node changes each time the digital file is accessed; and
- generating a multiencrypted key Ra by decrypting the encrypted portion first random key Ri' of the first computing node with a private key of the first computing, and using the generated multiencrypted key Ra as the key for recovering the digital file.

* * * * *